United States Patent
Suwa et al.

[11] Patent Number: 5,931,890
[45] Date of Patent: Aug. 3, 1999

[54] POSITIONING SYSTEM UTILIZING GPS SATELLITES

[75] Inventors: Yoshihisa Suwa, Nishio; Seiji Ishikawa, Aichi-gun; Tomohiro Yamamoto, Anjou; Takeshi Ito, Toyota; Tomio Yasuda, Kariya, all of Japan

[73] Assignee: Aisin Seiki Kabushiki Kaisha, Kariya, Japan

[21] Appl. No.: 08/808,955

[22] Filed: Feb. 19, 1997

[30] Foreign Application Priority Data

Feb. 21, 1996 [JP] Japan ................................ 8-033573

[51] Int. Cl.$^6$ .................................................. G06F 165/00
[52] U.S. Cl. ........................... 701/213; 701/214; 701/216; 342/357; 455/12.1
[58] Field of Search ...................... 701/213, 214, 701/215, 216; 342/347, 357; 455/3.2, 12.1, 13.1, 13.2

[56] References Cited

U.S. PATENT DOCUMENTS

| | | | |
|---|---|---|---|
| 5,144,318 | 9/1992 | Kishi | 342/357 |
| 5,390,124 | 2/1995 | Kyrtsos | 701/215 |
| 5,430,657 | 7/1995 | Kyrtsos | 701/226 |
| 5,483,456 | 1/1996 | Kuwahara et al. | 701/215 |
| 5,493,294 | 2/1996 | Morita | 701/213 |
| 5,631,838 | 5/1997 | Ishikawa et al. | 701/215 |
| 5,657,232 | 8/1997 | Ishikawa et al. | 701/213 |

FOREIGN PATENT DOCUMENTS

| | | |
|---|---|---|
| 61-137009 | 7/1986 | Japan . |
| 61-167886 | 7/1986 | Japan . |
| 156395 | 7/1991 | Japan . |
| 743446 | 2/1995 | Japan . |

*Primary Examiner*—William A. Cuchlinski, Jr.
*Assistant Examiner*—Gertrude Arthur
*Attorney, Agent, or Firm*—Sughrue, Mion, Zinn Macpeak & Seas, PLLC

[57] ABSTRACT

A positioning system is disclosed in which a rate of change $\Delta\Delta f$ in a Doppler shift $\Delta f$ of the radio wave transmitted from a GPS satellite is detected in order to determine whether or not an extraordinary radio wave as caused by a multi-path or the like is being received, and a GPS satellite from which an extraordinary radio wave is received is excluded from a group of GPS satellites which are utilized in a positioning calculation. A difference $\Delta f$ between a signal frequency $f0$ transmitted from a GPS satellite and a signal frequency $fR$ receiver is calculated, and a rate of change $\Delta\Delta f$ in the difference $\Delta f$ is also calculated. The position of a receiver is calculated on the basis of information transmitted from a plurality of GPS satellites for which the rate of change $\Delta\Delta f$ is equal to or less than a first threshold value, or $\Delta\Delta f \leq 30$ Hz/s, and the azimuth of a traveling direction of the receiver is calculated on the basis of information transmitted from a plurality of GPS satellites for which the rate of change $\Delta\Delta f$ is equal to or less than a second smaller threshold value or $\Delta\Delta f \leq 15$ Hz/s.

8 Claims, 5 Drawing Sheets

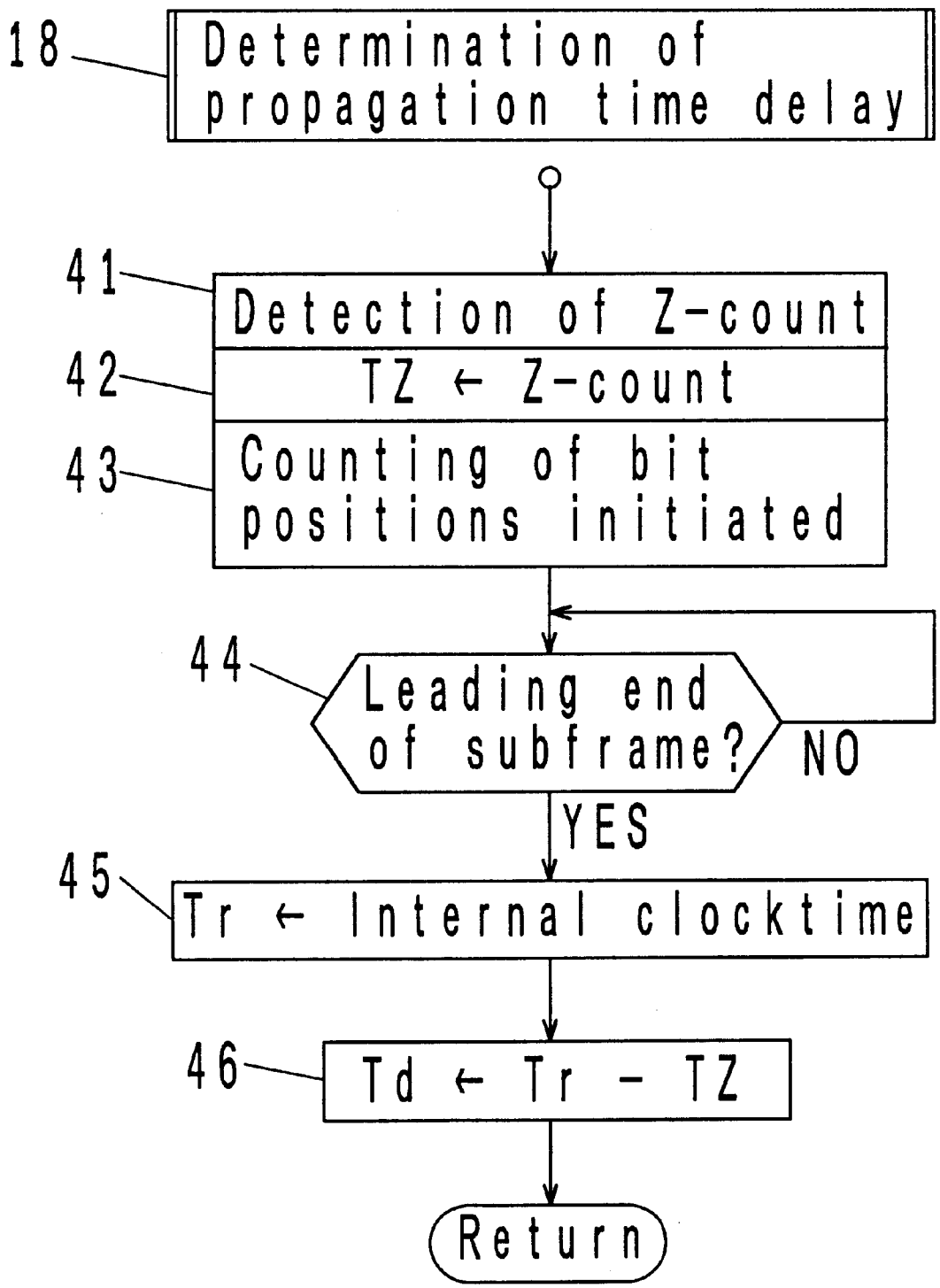

POSITIONING SYSTEM UTILIZING GPS SATELLITES

CROSS-REFERENCES TO RELATED PATENT APPLICATIONS (1) Application Ser. No. 08/465,901 filed on Mar. 15, 1994 and entitled "Onboard Positioning System", the inventors being Seiji Ishikawa et al. The system detects a relative speed of an own vehicle with respect to a satellite from a deviation of a tuning frequency caused by the Doppler effect, and determines a vehicle speed from the relative speed. A piezoelectric oscillating gyro detects an angular speed of rotation of the own vehicle, which is integrated to determine an azimuth. A travel is detected in terms of the vehicle speed and the azimuth, and the detected travel and information from available GPS satellites are substituted into a navigation equation to solve it for a solution.

(2) Application Ser. No. 08/284,247 filed on Aug. 2, 1994 and entitled "Apparatus for Verifying GPS Satellite Data" the inventors being Seiji Ishikawa et al. The apparatus calculates a distance r1 from a time delay required for the propagation of a radio wave between a transmitting and a receiving site and a distance r2 from the positions of a satellite and a point of reception. When a difference between these two distance is small, data from these satellites are regarded as valid data. However, when the difference is large, data is regarded as involving a large error.

The applications are assigned to the same assignee as the present application.

FIELD OF THE INVENTION

The invention relates to a positioning system utilizing GPS satellites, and in particular, to the selection of a plurality of satellites which are utilized in a positioning calculation which takes place onboard a vehicle.

BACKGROUND OF THE INVENTION

In a navigation system for automobiles which is gaining popularity recently, for example, the position of an automobile on which the system is mounted is determined by utilizing an information from GPS (Global Positioning System) satellites. Such a positioning technology is disclosed in Japanese Laid-Open Patent Application No. 137,009/86, for example.

Satellites transmit information which indicate their predetermined orbits and which indicate an exact timing when the information transmission from the satellites takes place. Such information can be received on earth to calculate the positions of the satellites on a basis of such information. In addition, a distance between a particular satellite and a point of reception can be calculated from a propagation time delay of radio wave. Accordingly, when information from four satellites is available simultaneously, for example, if equations which are derived from respective satellite information can be put into simultaneous equations, the latter may be solved to detect three-dimensional position (longitude, latitude and elevation) of the point of reception as well as an error of a clock provided on the part of a receiver in an accurate manner. If the elevation of the point of reception is known already, the longitude, the latitude and the error of the clock can be detected on the basis of the information available from three satellites. In addition, such positioning is also possible if the number of available satellites is equal to or less than two, by detecting an acceleration of a vehicle onboard and using the vehicle acceleration in an auxiliary manner.

However, when a GPS receiver is used in a hostile environment for the radio wave such as in a street, an anomalous solution (in respect to the position, the speed and azimuth) may be produced. One of reasons herefor is considered as a result of a positioning calculation which is made by using extraordinary radio waves as caused by multi-path (for example, reflected waves from a high-rise building). In Japanese Laid-Open Patent Applications No. 137,009/86 and No. 167,886/86, there is proposed a positioning system which is provided with a gyro, a speedometer and an altimeter or an azimuth instrument for supplementing wanting information when the number of available satellites is reduced, but this system can not compensate for an error in the positioning calculation which results when receiving extraordinary radio waves as caused by multi-path.

In Japanese Laid-Open Patent Application No. 43,446/95 (a corresponding U.S. patent application Ser. No. 08/614, 941, filed Aug. 2, 1994, and presently pending), the applicant has proposed a positioning system which verifies the correctness of information received by a GPS receiver. In this arrangement, a distance between the receiver and each of three or more GPS satellites in a group of GPS satellites from which a reception is possible is determined on the basis of positional information of GPS satellites and a receiver to derive a first distance. A time required for the radio wave to propagate from a GPS satellite to the receiver is calculated, and is multiplied by the speed of propagation (which is the velocity of light) to provide a second distance. When there is a large difference between the first and the second distance, it is assumed that there is at least one GPS satellite in the group, the information transmitted from which is in error. Accordingly, one of GPS satellites in the group is replaced by another in the set to repeat a similar calculation and an error check. In this manner, a particular GPS satellite which transmitted erroneous information is identified, and is registered as unusable while the remaining GPS satellites which have been determined as transmitting correct information are registered as usable GPS satellites. A positioning calculation is then made by utilizing only usable GPS satellites. In this manner, GPS satellite or satellites which have undergone on offset from the orbit to cause a deviation between its actual position and information transmitted thereby is removed from indices which are used in the positioning calculation, thus reducing an error which is caused in the positioning calculation.

However, this represents a verification of the correctness of information transmitted by GPS satellites, and its believed to be unsatisfactory to avoid an anomalous solution when receiving extraordinary radio waves as caused by multi-path (for example, reflected waves from high-rise building) because it is impossible to identify which information of received data from GPS satellites is erroneous as a result of radio receiving environment on earth, in particular a local environment. In addition, the calculation of the first and the second distance is repeated by changing one of the GPS satellites in the group by another which is out of the group, which takes a relatively long time interval.

SUMMARY OF THE INVENTION

The invention has for its first object a reduction of a positioning error as caused by extraordinary radio waves caused by multi-path or the like (for example, reflected waves from a high-rise building) in a hostile environment, such as in a street, for the radio waves, and has for its second object a reduction in the time required to examine if a receiver is receiving extraordinary radio waves.

A positioning system utilizing GPS satellites according to the invention comprises receiving means (11, 12) for receiving information from a plurality of GPS satellites which transmit their orbital information and timing information; deviation calculation means (16) for calculating a difference, $\Delta f(=fR-f0)$, between a signal frequency (f0) transmitted by the GPS satellite and a signal frequency (fR) received by the receiving means; variation calculation means (16) for obtaining a rate of change $\Delta\Delta f$ in the difference $\Delta f$; and positioning calculation means (16) for determining a position of a point of reception on the basis of information received by the receiving means from a plurality of GPS satellites for which the rate of change $\Delta\Delta f$ remains within a preselected range ($\Delta\Delta f \leq 30$ Hz/s).

It is to be noted that reference numerals or characters applied to corresponding elements used in an embodiment to be described later are indicated in parentheses in order to facilitate the understanding.

The difference $\Delta f(=fR-f0)$ between the signal frequency (f0) transmitted by one of the GPS satellites and the signal frequency (fR) received by the receiving means (11, 12) is a so-called Doppler shift, which assumes a value corresponding to velocity of relative movement (velocity vector) of the receiving means (11, 12) with respect to a GPS satellite.

When the receiving means (11, 12) is receiving a radio wave which propagates straightforward from one of the GPS satellites, the Doppler shift $\Delta f$ represents a velocity of relative movement of the receiving means (11, 12) with respect to the GPS satellites, and is referred to as a normal Doppler shift. By contrast, when the receiving means (11, 12) is receiving reflected waves from a high-rise building, for example, the Doppler shift $\Delta f$ corresponds to a combination of a velocity of relative movement of the high-rise building with respect to the GPS satellite and velocity of relative movement of the receiving means (11, 12) with respect to the building, and is referred to as an abnormal Doppler shift.

When the receiving means (11, 12) is mounted onboard a vehicle which is running through a street or therearound and is receiving radio waves coming straightforward from the GPS satellites, a rate of change, $\Delta\Delta f$, in the Doppler shift $\Delta f$ represents a relative acceleration vector of the receiving means (11, 12) with respect to the GPS satellites, which remains within a range of accelerations of a vehicle which occur during a normal driving condition. However, when the receiving means (11, 12) switches from receiving radio waves coming straightforward from GPS satellites to receiving reflected waves from a high-rise building, the Doppler shift changes from a normal one to an extraordinary one, whereupon the rate of change $\Delta\Delta f$ rapidly changes to a high value (in absolute magnitude).

In the positioning system according to the invention, the deviation calculation means (16) calculates a Doppler shift $\Delta f(=fR-f0)$, namely, difference between the signal frequency (fR) received by the receiving means (11, 12) and the signal frequency (f0) transmitted from the GPS satellite, and the variation calculation means (16) determines a rate of change $\Delta\Delta f$ in the Doppler shift $\Delta f$, and the positioning calculation means (16) determines a position of a point of reception on the basis of information received by the receiving means (11, 12) from a plurality of GPS satellites for which the rate of change $\Delta\Delta f$ remains within a preselected range ($\Delta\Delta f \leq 30$ Hz/s). Accordingly, any GPS satellite for which the rate of change $\Delta\Delta f$ becomes high as a result of switching of the receiving means (11, 12) form receiving radio waves coming straightforward from GPS satellites to receiving reflected waves from a high-rise building is removed from providing indices to be used in the positioning calculation. In this manner, the possibility that a positioning error be caused by extraordinary radio waves, as produced by multi-path or the like in hostile environment to radio waves such as in a street (for example, reflected waves from a high-rise building), can be reduced.

The reception frequency (fR) of a radio wave transmitted by a GPS satellite is obtained in the course of an automatic tuning operation which occurs during the reception of radio wave. The emitted frequency (f0) is known as a nominal frequency, and thus the calculation of the Doppler shift $\Delta f(=fR-f0)$ is simple and not time consuming. In addition, a rate of change $\Delta\Delta f$ can be obtained by calculating $\Delta f$ at a given period, which may be equal to a period Ts used to calculate a positioning solution from a GPS receiver, and subtracting a current value $\Delta f$ from a previous value $\Delta f'$, which occurred Ts before, and this again is simple and not time consuming.

Other objects and features of the invention will become apparent from the following description of an embodiment thereof with reference to the drawings.

BRIEF DESCRIPTION OF THE DRAWINGS

FIG. 5 is a flow chart showing a step 18 shown in FIG. 3 in detail.

DESCRIPTION OF THE PREFERRED EMBODIMENT

Figure 1:
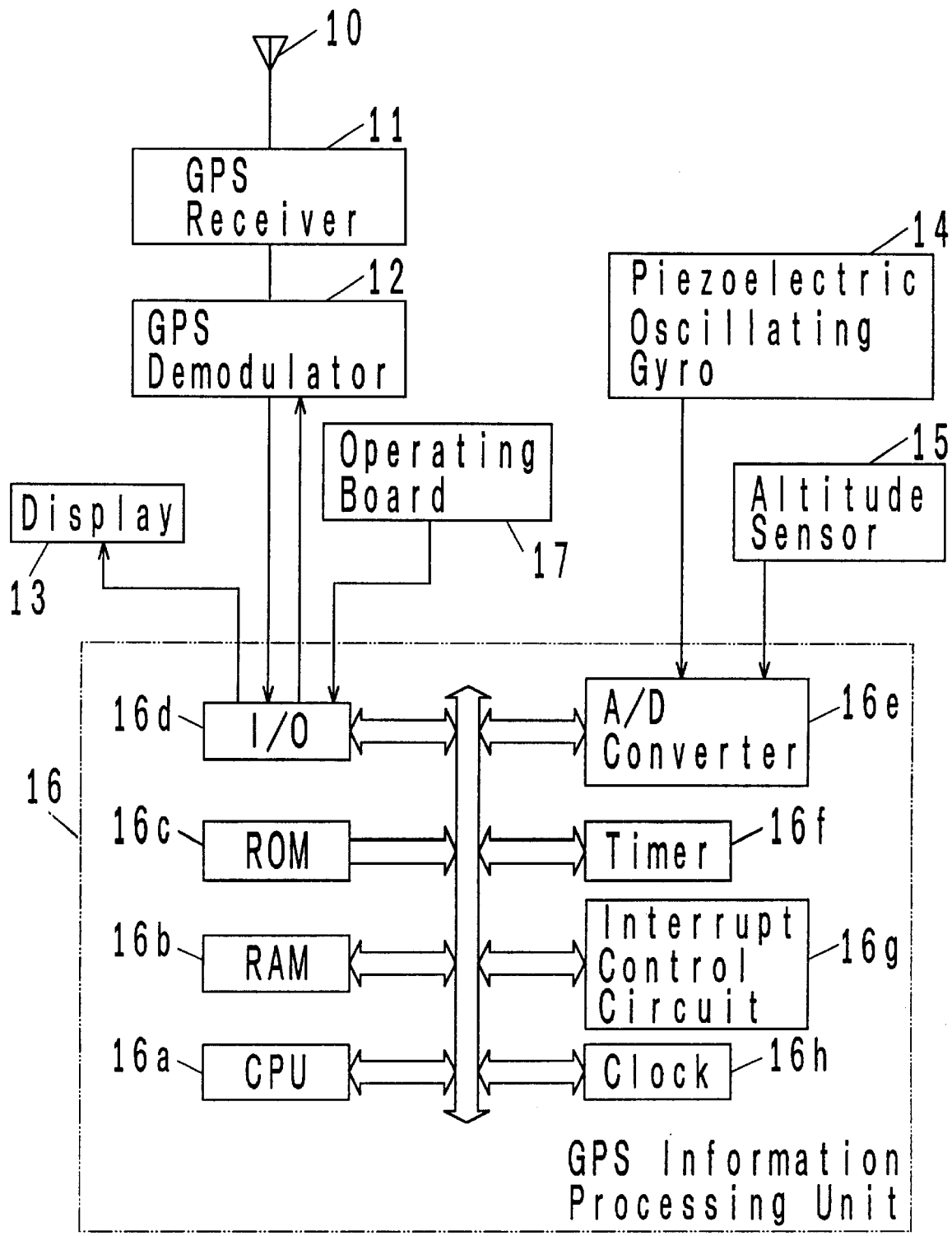
FIG. 1 is a block diagram of one embodiment of the invention.

Referring to FIG. 1 which shows one embodiment of the invention, a positioning system of the present embodiment is mounted onboard a vehicle which runs on the ground, and comprises a receiving antenna 10, a GPS receiver 11, a GPS demodulator 12, a display 13, a piezoelectric oscillating gyro 14, an altitude sensor 15, a GPS information processing unit 16 and an operating board 17. Each of radio waves transmitted from GPS satellites and having frequency of 1.57542 GHz is received by the GPS receiver 11 through the antenna 10, and information carried by the radio wave, namely, information representing a function which indicates an orbit of the satellite and a timing is demodulated in the GPS demodulator 12 to be input to the GPS information processing unit 16.

Fundamentally, the GPS information processing unit 16 operates to generate information (longitude, latitude and altitude) representing the position of an own vehicle on the basis of information transmitted form GPS satellites, to generate relative positional information of the running point with respect to a predetermined index such as a crossover or well recognized building or the like, and to deliver both information to the display 13. A basic arrangement comprising the receiving antenna 10, the GPS receiver 11, the GPS demodulator 12 and the display 13 as well as a basic operation of the GPS information processing unit 16 are similar to those of corresponding components in a known apparatus which is already commercially available.

When radio waves from four GPS satellites can be received simultaneously, the position of an own vehicle can be accurately determined as a result of calculation which is based only on the information conveyed by these radio waves. The position of an own vehicle can also be determined by calculation when the number of available GPS satellites is three or less, by making reference to information which is delivered from the piezoelectric oscillating gyro 14 and the altitude sensor 15. The piezoelectric oscillating gyro 14 is fixedly mounted onboard a vehicle, and delivers a signal having a level which is proportional to the angular rate ω of rotation about a vertical axis of the vehicle.

The GPS information processing unit 16 is a computer system including a microprocessor (hereafter referred to as CPU) 16a, RAM 16b, ROM 16c, I/O port 16d, A/D converter 16e, a timer 16f, an interrupt control circuit 16g and a clock 16h. Analog signals which are output from the gyro 14 and the altitude sensor 15 are converted into corresponding digital data by the A/D converter 16e before they are input to CPU 16a. Information delivered from the GPS demodulator 12 and information which controls the demodulator 12 are accessed through the I/O port 16d.

Figure 2:
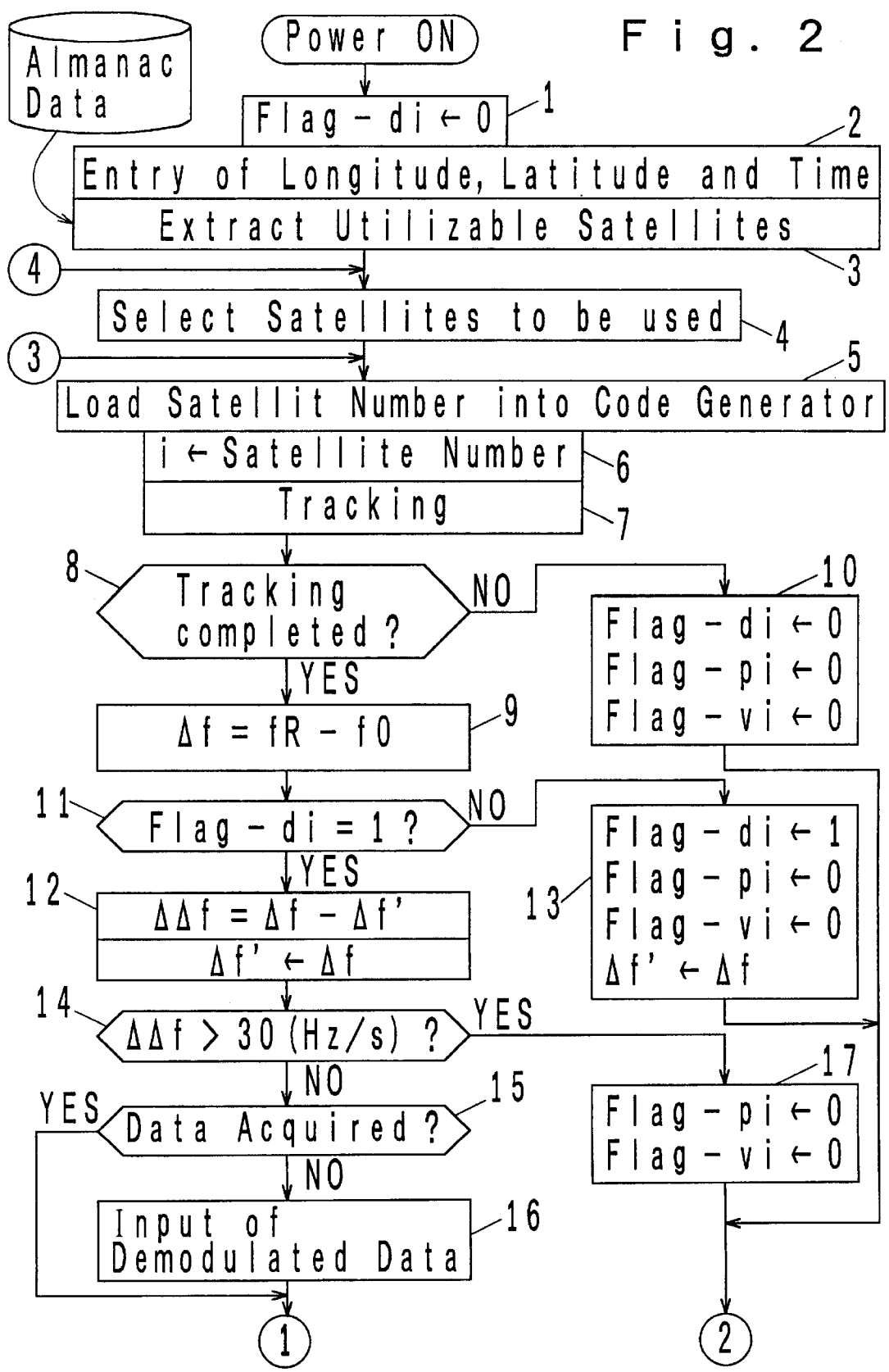
FIG. 2 is a flow chart showing a part of the operation of CPU 16a shown in FIG. 1.

The operation of CPU 16a in the GPS information processing unit 16 will be described in summary with reference to FIGS. 2 and 3. Initially referring to FIG. 2, when a power supply is turned on, CPU 16a proceeds to step 1 where status registers Flag-di are initialized or reset to 0. Each of the status registers Flag-di stores data indicating whether a Doppler shift has already been calculated. In the present embodiment, up to eight available satellites can be registered, and thus i=1 to 8. Accordingly, eight satellites No. 1 to No. 8 which are registered at step 3, as will be described later, are associated with status registers Flag-dl to Flag-d8, respectively. In the description to follow, "i" means either the entire assembly from 1 to 8 or one of them. "0" data stored in a status register Flag-di represents that a Doppler shift of a radio wave transmitted from a satellite No. i which is registered at step 3 is not yet calculated. Conversely, "1" data in the status register Flag-di represent that a Doppler shift of a radio wave transmitted from a registered satellite No. i has been calculated.

A status register Flag-pi to be referred to hereafter stores data indicating whether a particular registered satellite can be utilized in a positioning calculation or not. Specifically, "0" data stored in the status register Flag-pi indicates that a registered satellite No. i can not be utilized in the calculation of the position of an own vehicle while "1" data stored in the status register Flag-pi indicates that the registered satellite No. i can be utilized in the calculation.

A status register Flag-vi referred to later stores data which indicates whether a particular registered satellite can be utilized in the calculation of a velocity vector of an own vehicle or not. Thus, "0" stored in the status register Flag-vi indicates that a registered satellite No. i can not be utilized in the calculation of the velocity vector of an own vehicle while "1" stored in the status register Flag-vi indicates that the registered satellite No. i can be utilized in such calculation.

Upon initializing status registers Flag-di, CPU 16a displays an entry screen on the display 13 urging an operator to make an entry, thus reading an entry which is made by an operator (steps 2 and 3). An entry made by an operator includes the longitude and the latitude of a current position as well as the current time. Upon reading such entry, CPU 16a initializes the longitude, the latitude and the time. Specifically, entered values are written into a longitude and a latitude register, and the clock 16h is brought into coincidence with the entered time. In the absence of numerical input from the operator, the longitude and the latitude which are saved in a non-volatile memory, which is a battery backupped memory, within a block of RAM 16b are written into the longitude and the latitude register (step 2).

CPU 16a then extracts GPS satellites which are available at the prevailing time from a number of GPS satellites. This operation is executed by referring to Almanac data which is previously provided in an internal memory 16c. The Almanac data contains the positions of individual GPS satellites which prevail from time to time, and accordingly, by determining the position of each GPS satellite at the prevailing time, and on the basis of such GPS position and the position of the own vehicle, an angle of elevation as each GPS satellite is viewed from the own vehicle is calculated. Eight GPS satellites are extracted which exhibit the greatest angles of elevation, and their numbers (satellite-numbers indicated on Almanac data) are determined, to which number i from 1 to 8 is assigned in the sequence they are extracted (step 3). Thus, the number of the extracted GPS satellite (satellite number as indicated on the Almanac data) is written into a registration table, defined by a region of a memory, at a first to an eighth address in the sequence the satellites are extracted.

At next step 4, GPS satellites which are to be used are selected (which are subject to steps 7 to 23 to be described later). When the step 4 is executed for the first time after the power supply is turned on (first pass), the eight GPS satellites extracted at step 3 are selected. However, during a second and subsequent pass, the execution of the step 4 selects those GPS satellites for which status registers Flag-di, Flag-pi or Flag-vi contain "1" data, while GPS satellites for which status registers Flag-di, Flag-pi or Flag-vi contain "0" data are all excluded. When the number of selected GPS satellites becomes less than 4 as a result of such exclusion, one of the eight GPS satellites mentioned above except for the GPS satellite which is presently excluded is selected.

Each of the selected GPS satellites is subject to the execution of steps 5 to 22, including a tracking of GPS satellite (step 5 to 8 and 10), a calculation of Doppler shift Δf (step 9), a calculation of a rate of change ΔΔf in the Doppler shift Δf (namely, a change during a time interval Ts) (steps 11 to 13), a decision over abnormality of the rate of change ΔΔf (steps 14 and 17), saving information from GPS satellites (steps 15 and 16), calculation of distance (steps 18 and 19) and a decision over reliability of received radio wave on the basis of the rate of change ΔΔf (steps 20 to 22).

The detail of the executions at steps 5 to 22 will be described with reference to one of GPS satellites, i, which is of interest. A satellite number of the satellite i of interest, which is available from Almanac data, is loaded into a code generator of the GPS demodulator 12 (at step 5). A radio wave transmitted by a GPS satellite has a diffused spectrum formed in accordance with PN code (Gould code comprising 1023 bits turnaround) which is assigned to that satellite. Accordingly, to demodulate information transmitted from the GPS satellite, it is necessary to perform an inverse spectrum diffusion with respect to the received signal, using the same PN code as used on the transmitting side. The PN code of each GPS satellite is previously known and is registered on the Almanac data and is loaded into the code generator. A transmitting frequency f0 of the satellite of interest, which is commonly known as a nominal frequency, is also extracted from the Almanac data and saved in a register.

At next step 6, status registers Flag-di, Flag-pi, Flag-vi are identified which correspond to the number "i" of the satellite of interest i. In other word, only those status registers corresponding to the "i" which is assigned to the satellite of interest at step 3 are subject to the operations described below with reference to steps 10 to 22. For example, if the satellite of interest is picked out in the third place at step 3, indicating that i=3, the status registers subject to the step 10 to 22 are identified as Flag-d3, Flag-p3, Flag-v3.

At step 7, a tracking of the PN code on the transmitting and the receiving side is performed. Specifically, even though the PN codes are same on the transmitting and the receiving side, the inverse spectrum diffusion process can not take place unless they are coincident in phase, and accordingly, the both PN codes need be brought into phase with each other. In practice, the PN code on the receiving side produced at bit rate (1.024 Mbps) which is slightly faster than the bit rate on the transmitting side (1.023 Mbps) so that there occurs a phase offset in the PN code between the transmitting and the receiving side, corresponding to one bit, during one turnaround of the PN code. Thus a phase difference between the both PN codes changes with time. When a phase difference between the PN codes on the transmitting and the receiving side is removed, the bit rate of the code generator is adjusted so that the bit rate on the receiving side is equal to the bit rate on the transmitting side, thus achieving synchronization of phase of the PN code.

When a synchronization of the phase is achieved, there appears a signal at the output of the demodulator. The tuning frequency or received frequency fR which prevails at this time is saved, and a Doppler shift $\Delta f=fR-f0$ is calculated and saved in a register (step 9). In the event of a failure of achieving the synchronization or when the tracking has been unsuccessful, status registers Flag-di, Flag-pi and Flag-vi corresponding to the satellite of interest are cleared at step 10. The operation then proceeds to step 23 where an examination is made to see if the execution of steps 5 to 22 which follow the tracking have been completed for all the selected satellites. If there is a remaining satellite or satellites for which execution is not completed, the operation returns to repeating the tracking for the next satellite (steps 5 to 7).

When the tracking is successful and the Doppler shift $\Delta f=fR-f0$ is calculated, an examination is made to see data stored in the status register Flag-di at step 11. If the data stored in this register is "0", indicating that there is no Doppler shift which is calculated during the previous pass for the satellite of interest, the rate of change $\Delta\Delta f$ can not be calculated, but since the Doppler shift has been calculated for the current pass, "1" is written into this register since the calculation of the rate of change is enabled for the next pass. Status registers Flag-pi and Flag-vi are cleared, and a currently calculated value $\Delta f$ is written into a previous calculated value register $\Delta f'$ at step 13. Subsequently, the operation proceeds to step 23 where it is examined if the execution of the steps 5 to 22 have been completed for all the selected satellites. If there are some satellites for which the execution is not completed, the operation returns to the tracking of a next satellite (steps 5 to 7).

When it is found at step 11 that the data contained in the status register Flag-di is "1", indicating that there is a Doppler shift which is calculated for the satellite of interest during a previous pass to enable the calculation of the rate of change $\Delta\Delta f$, the rate of change $\Delta\Delta f=\Delta f-\Delta f'$ is calculated and saved in a register, and then the currently calculated value $\Delta f$ is written into a previous calculated value register $\Delta f'$ at step 12. An examination is then made to see if the rate of change $\Delta\Delta f$ exceeds a first threshold value 30 Hz/s in order to determine if $\Delta\Delta f$ is an extraordinary value or not at step 14. In the present embodiment, the first threshold value to determine whether the rate of change is extraordinary or not is chosen to be 30 Hz/s. $\Delta\Delta f$ which is greater than 30 Hz/s is a rate of change in the Doppler shift which can not be occur in actuality when the vehicle is receiving a radio wave coming straightforward from the GPS satellite. Accordingly, when $\Delta\Delta f$ is greater than 30 Hz/s, it is determined that this is a reception of extraordinary radio wave as caused by multi-path or the like (such as reflected waves from a high-rise building, for example), and the satellite of interest is determined as not utilizable, in the same manner as when the tracking is unsuccessful. Specifically, status registers Flag-di, Flag-pi and Flag-vi are cleared at step 17, and the operation then proceeds to step 23 where it is examined if the execution of steps 5 to 22 have been completed for all the selected satellites. If there is any remaining satellite for which the execution is not completed, the operation returns to the tracking of a next satellite (step 5 to 7).

Figure 4:
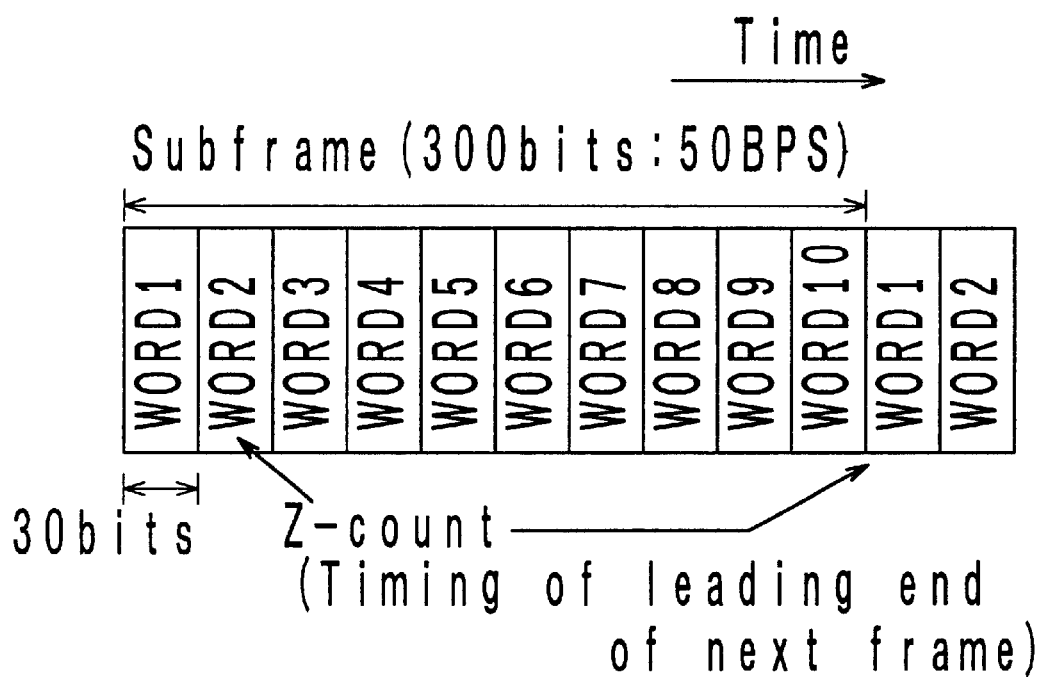
FIG. 4 is a timing chart representing the construction of transmitted data from a satellite.

If it is found at step 14 that $\Delta\Delta f$ is equal to or less than 30 Hz/s, the operation proceeds through step 15 to step 16 where the input of demodulated data is initiated. A signal transmitted by GPS satellite comprises a binary signal having a bit rate of 50 bps, and is a repetition of a subframe comprising 300 bits, as shown in FIG. 4. Each subframe comprises ten words, namely, word 1 to word 10, each comprising 30 bits. Data contains a preamble which enables a frame synchronization, Z-count indicating a transmitting time, ephemeris indicating the orbit of a satellite and Almanac data or the like. Initially, the preamble is detected to achieve a frame synchronization, followed by storing succeeding data in a memory at addresses corresponding to the bit positions within the subframe.

Figure 3:
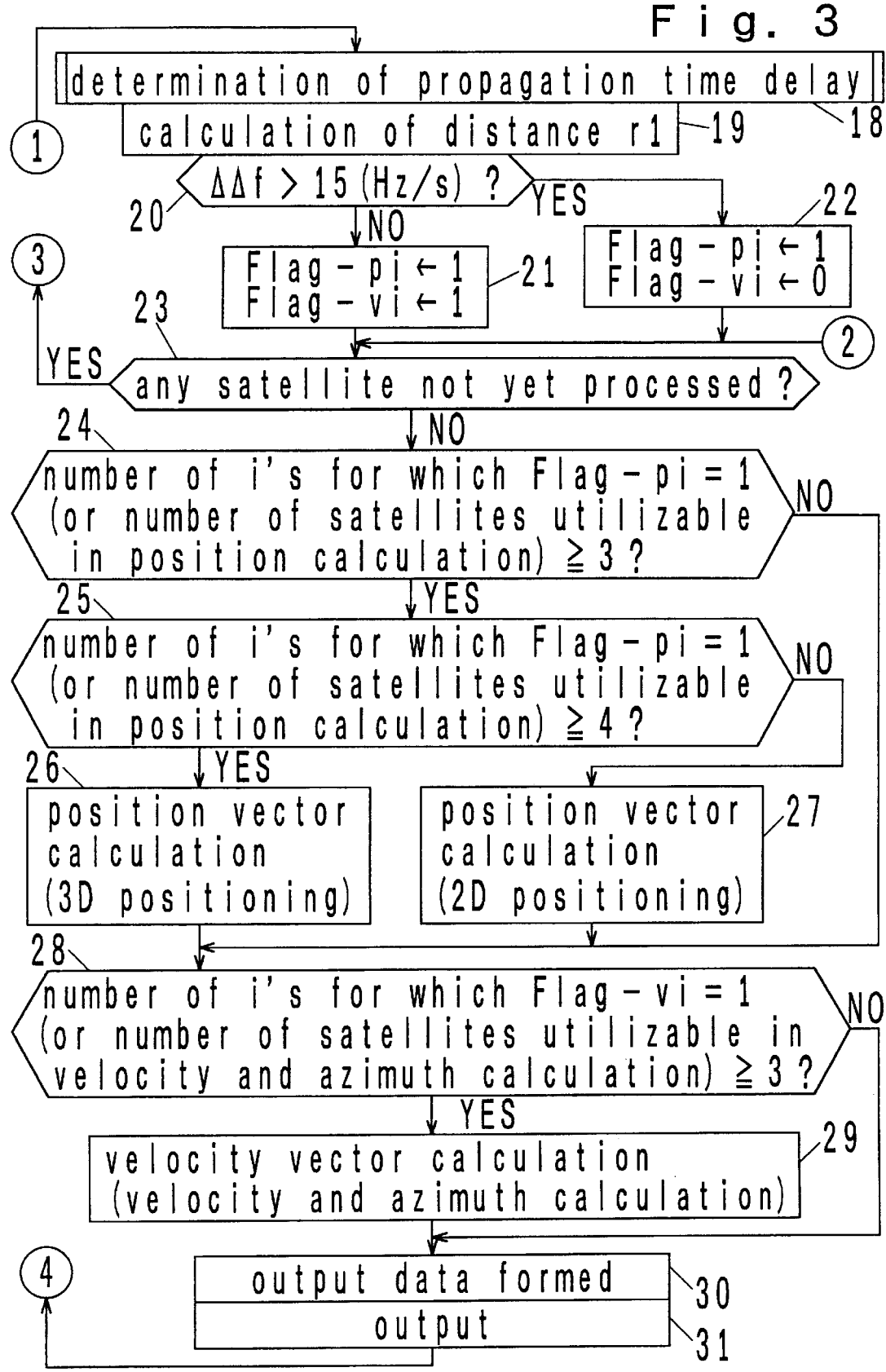
FIG. 3 is a flow chart of the remaining portion of the operation of CPU 16a shown in FIG. 1.

With continued reference to FIG. 3, a time interval required for the propagation of a radio wave, since it is transmitted from the satellite until it reaches a point of reception, namely, a propagation time delay, is determined at next step 18. The detail of this step is shown in FIG. 5. Referring to FIG. 5, time data, referred to as Z-count, is detected at step 41. As shown in FIG. 4, Z-count is contained in word 2 of each subframe in the transmitted data, and detected content is stored in a memory TZ at step 42. A counting of a bit position is initiated at step 43.

The content of Z-count indicates a predetermined timing when the leading end of the next subframe is to be transmitted, and this timing is very accurate. Accordingly, a difference between the time when the leading end of the next subframe is detected on the receiving side and the time indicated by the Z-count is equivalent to the propagation time delay of the radio wave between the transmitting and receiving points. However, the timing of the leading end of the next subframe must be accurately detected without involving any time delay. For this reason, upon detecting the Z-count, a number of bits which begin with that point in time is counted to maintain a monitoring of the bit position. At step 44, the appearance of the leading end of a leading bit in the next subframe is waited for. When the leading end of the leading bit in the next subframe which follows the detection of the Z-count appears, the operation proceeds from step 44 to step 45 where timing information which is available from an internal clock 16*h* at this time is stored in a memory Tr.

At next step 46, the content of the memory Tz is subtracted from the content of the memory Tr, and the result stored in a memory Td. Thus, a time difference between the time indicated by the Z-count and an actual time of reception is stored in the memory Td. While the time indicated by the internal clock 16*h* is not always accurate, assuming that any error is sufficiently small, the content of the memory Td coincides with the propagation time delay of the radio wave between the transmitting and the receiving point.

While the operation shown in FIG. 5 is carried out by a softwave in a computer in the present embodiment, part or the whole of such operation may be executed by a devoted hardware.

Returning to FIG. 3, a distance r1 between the GPS satellite from which date is being received and the point of reception is calculated on the basis of the determined propagation time delay or the content stored in the memory Td at step 19. Since the rate of propagation of the radio wave is the same as the velocity of light and constant, the propagation time delay may be multiplied by the velocity of light to obtain a distance r1. The distance r1 is used as a distance parameter in a "position vector calculation (3D positioning)" 26, "position vector calculation (2D positioning)" 27 and "velocity vector calculation" 29 which will be described later.

At next step 20, an examination is made to see if the rate of change $\Delta\Delta f$ is not greater than a second threshold value 15 Hz/s. The second threshold value (15 Hz/s) is used in order to distinguish a case where the reliability of calculation of velocity vector is low such as when an error of a relatively large magnitude may be caused in the calculated value of the velocity vector of vehicle or a receiver when the calculation is based on information received from a satellite, which may occur typically as a result of a change in the acceleration, deceleration or traveling direction even though the change is not so large as when occurring for a change from the reception of a radio wave coming straightforward from a satellite to the reception of an extraordinary radio wave as cause by a multi-path.

When the rate of change $\Delta\Delta f$ exceeds the second threshold value 15 Hz/s, it is expected that the reliability of the velocity vector calculated on the basis of information from the satellite of interest is low, and accordingly, "1" is written into register Flag-pi, indicating that the information from the satellite of interest is utilizable, but register Flag-vi is cleared in order to assure that no reference be made to information from the satellite of interest in a calculation of the velocity vector (step 22). When the rate of change $\Delta\Delta f$ is equal to or less than the second threshold 15 Hz/s, "1" is written into both registers Flag-pi and Flag-vi (step 21).

An examination is then made to see if the execution of the steps 5 to 22 have completed for all of the satellites which are selected at step 4 (step 23). If there remains a satellite or satellites for which the execution has not yet been completed, that satellite is chosen as a satellite of interest to repeat the described operation.

When the execution of the described operation has been completed for-all satellites selected at step 4, registers Flag-pi which contain "1", indicating that a corresponding satellite can be utilized in a positioning calculation, are picked out. When the number of such registers is equal to or greater than four, they are subject to "position vector calculation (3D positioning)" 26. When the number is equal to three, they are subject to "position vector calculation (2D positioning)" 27. When the number is equal to or less than two, the calculation of the position vector is not executed (steps 24 to 27).

The fundamental technique used in the "position vector calculation (3D positioning)" at steps 26 and "position vector calculation (2D positioning)" at steps 27 is known in the art, and will not be described in detail. Briefly, for the calculation at step 26, four sets of data received from four satellites corresponding to the registers Flag-pi which contain "1" are substituted into predetermined four simultaneous equations, which are solved for unknown variables including the longitude and the latitude of the point of reception as well as an error in the clock on the receiving side. An altitude of the point of reception is derived by calculation from an output signal from the altitude sensor 15 in the present example, and is substituted into the above equations as known data. An error in the clock on the receiving side can be determined as a result of executing either positioning calculation, and the time indicated by the internal clock 16h is corrected on the basis of such error information.

At step 28, registers Flag-vi containing "1", indicating that corresponding satellites are utilizable in the calculation of the velocity, are picked out. If there are three or more such registers, "velocity vector calculation" 29 is executed, but this calculation is not executed when the number of such registers is equal to or less than two. In this calculation, the speed of the vehicle (and hence the receiver) relative to the ground and the azimuth of traveling direction are calculated on the basis of data received from three satellites and the above data derived by the operation mentioned above.

On the basis of the longitude and the latitude of the point of the reception, the speed relative to the ground and the azimuth of the traveling direction, which are obtained up to this point (any data which can not be obtained anew is replaced by data that is saved), output data are subject to calculation and edition (step 30), and is then delivered to the display 13 (step 31). Specifically, an area No. of an area which contains the point of reception is retrieved from ROM 16c on the basis of the longitude and the latitude of the point of reception, and an examination is made to see if the area No. thus derived matches an area No. indicated on a map being displayed. When they do not match, a map information for area No. which is obtained by the retrieval is transferred from ROM 16c to the display 13 by DMA transfer. In this manner, a mark representing the point of reception is indicated on the map which is being displayed by the display 13 (alternatively the map representing the point of reception is shifted to the point of reception which is now determined). A distance from the point reception to an index on the ground which is entered on the map as well as an azimuth of the index as viewed from the point of reception are additionally displayed on the display 13, together with the longitude and the latitude of the point of reception, the relative speed with respect to the ground and the azimuth. Any data which has been displayed may be updated by latest data.

The operation then returns to step 4. Satellites which are selected by the execution of step 4 during a previous pass and for which corresponding registers Flag-di, Flag-pi and Flag-vi contain "0" are picked out, and are removed from a selection memory. A number of satellites which remain within the selection memory is counted. If the count equal to or less than four, those of the eight satellites which are extracted at step 3 except for ones which are currently removed from the selection memory and ones which remain in the selection memory are added to the selection memory. The operation then proceeds to step 5.

When the GPS receiver derives a positioning solution by calculation at period of Ts=one second, CPU 16a executes the steps 4 to 31 in a period of Ts=one second for each of the satellites. Accordingly, the period with which the rate of change $\Delta\Delta f$ is calculated is also one second period, and $\Delta\Delta f$ represents a variation in the Doppler shift $\Delta f$ during the period Ts=one second.

In the embodiment described above, when the rate of change $\Delta\Delta f$ in the Doppler shift $\Delta f$ of the radio wave from the satellites exceeds the first threshold of value 30 Hz/s, "0" is written into registers Flag-di, Flag-pi and Flag-vi which correspond to such satellite (step 17) in the similar manner as for a failure of the tracking, avoiding a reference to such satellite in the positioning calculation (which takes place at step 26, 27) and in the velocity calculation (which takes place at step 26). In this manner, an error in such calculation is reduced in a situation where an abnormality of reception is expected as when changing from the reception of radio wave coming straightforward from a satellite to the reception of an extraordinary radio wave as caused by a multipath (such as a reflected wave from a high-rise building, for example).

In addition, when the rate of change $\Delta\Delta f$ exceeds the second threshold 15 Hz/s, "1" is written into register Flag-pi, but "0" is written into register Flag-vi (step 22), thus assuring that no reference is made to this satellite in the velocity calculation (which takes place at step 20) even though a reference is made to such satellite in the position calculation (which takes place at steps 26, 27). Accordingly an error in a velocity calculation is also reduced as the acceleration or deceleration of the vehicle (receiver) is high, or when the traveling direction of the vehicle rapidly changes.

In this manner, a decision upon the favorable or hostile environment of receiving radio waves transmitted by the satellites is rendered on the basis of the rate of change $\Delta\Delta f$ in the Doppler shift, but it should be noted that the calculation of the Doppler shift $\Delta f$ (step 9) and the calculation of the rate of change $\Delta\Delta f$ therein consumes little time, and the length of time required by CPU 16a to render such decision is minimal.

While a preferred embodiment of the invention has been shown and described above, a number of changes and modification are possible therein. Accordingly, it is not intended that the invention be limited to the specific construction or arrangement disclosed herein, but that the right is reserved to all changes and modifications coming within the scope of invention defined by the appended claims.

What is claimed is:

1. A positioning system utilizing GPS satellites comprising receiving means for receiving information from a plurality of GPS satellites which transmit their respective orbital information and timing information;

deviation calculation means for calculating a difference $\Delta f$ between a signal frequency transmitted by one of the GPS satellites and a signal frequency received by the receiving means;

variation calculation means for obtaining a rate of change $\Delta\Delta f$ in the difference $\Delta f$;

and positioning calculation means for determining the position of the receiving means on the basis of information received by the receiving means from a plurality of GPS satellites for which the rate of change $\Delta\Delta f$ remains within a preselected range.

2. A positioning system utilizing GPS satellites according to claim 1 in which the positioning calculation means determines the position of the receiving means on the basis of information received by the receiving means from a plurality of GPS satellites for which the rate of change $\Delta\Delta f$ is equal to or less than a first threshold value, and determines the azimuth of a traveling direction of the receiving means on the basis of information received by the receiving means from a plurality of GPS satellites for which the rate of change $\Delta\Delta f$ is equal to or less than a second threshold value which is less than the first threshold value.

3. A positioning system utilizing GPS satellites according to claim 1 in which the positioning calculation means selects a plurality of GPS satellites and enter them into a registration table on the basis of Almanac data relating to a plurality of GPS satellites and the position of the receiving means, performs a tracking of each GPS satellite in the registration table utilizing the receiving means, removes from the registration table any GPS satellite which resulted in a failure of tracking and those GPS satellites for which the rate of change $\Delta\Delta f$ is outside the preselected range, and whenever the number of GPS satellites which remain in the registration table is reduced below a given value, a GPS satellite or satellites which are not entered in the registration table, except GPS satellites which are removed, is added to the registration table.

4. A positioning system utilizing GPS satellites according to claim 3 in which the positioning calculation means determines the position of the receiving means on the basis of information received by the receiving means from a plurality of GPS satellites for which the rate of change $\Delta\Delta f$ is equal to or less than a first threshold value, determines the azimuth of a traveling direction of the receiving means on the basis of information received by the receiving means from a plurality of GPS satellites for which the rate of change $\Delta\Delta f$ is equal to or less than a second threshold value which is less than the first threshold value, and removes a GPS satellite or satellites for which the rate of change $\Delta\Delta f$ exceeds the first threshold value from the registration table.

5. A positioning system utilizing GPS satellites comprising receiving means for receiving information from a plurality of GPS satellites which transmit their orbital information and timing information;

an altitude sensor for detecting the altitude of the receiving means;

deviation calculation means for calculating a difference $\Delta f$ between a signal frequency transmitted by one of the GPS satellites and a signal frequency by the receiving means;

variation calculation means for determining a rate of change $\Delta\Delta f$ in the difference $\Delta f$;

and positioning calculation means for determining the position of the receiving means on the basis of information received by the receiving means from the GPS satellites when the number of GPS satellites for which the rate of change $\Delta\Delta f$ remains within a preselected range is equal to four or greater, and for determining on the basis of information received by the receiving means from the GPS satellites and an altitude detected by the altitude sensor when the number of GPS satellites for the rate of change $\Delta\Delta f$ remains within the preselected range is three.

6. A positioning system according to claim 5 in which the positioning calculation means determines the position of receiving means on the basis of information received by the receiving means from a plurality of GPS satellites for which the rate of change $\Delta\Delta f$ is equal to or less than a first threshold value, and determines the azimuth of a traveling direction of the receiving on the basis of information received by the receiving means from a plurality of GPS satellites for which the rate of change $\Delta\Delta f$ is equal to or less than a second threshold value which is less than the first threshold value.

7. A positioning system according to claim 5 in which the positioning calculation means selects a plurality of GPS satellites and write them into a registration table on the basis of Almanac data for a plurality of GPS satellites and the position of the receiving means, tracks each of the GPS satellites in the registration table with the receiving means, removes a GPS satellite or satellites which failed to be tracked and a GPS satellite or satellites for which the rate of change $\Delta\Delta f$ is outside the preselected range from the registration table, and in the event the number of GPS satellites which remain in the registration table reduces below a given value, adds a GPS satellite or satellites which are not entered on the registration table, except for the removed GPS satellites, to the registration table.

8. A positioning system according to claim 7 in which the positioning calculation means determines the position of the receiving means on the basis of information received by the receiving means from a plurality of GPS satellites for which the rate of change $\Delta\Delta f$ is equal to or less than a first threshold value, and determines the azimuth of a traveling direction of the receiving means on the basis of information received by the receiving means from a plurality of GPS satellites for which the rate of change $\Delta\Delta f$ is equal to or less than a second threshold value which is less than the first threshold value, and removes a GPS satellites for which the rate of change $\Delta\Delta f$ exceeds the first threshold value from the registration table.

* * * * *